United States Patent
Kawarizadeh

(10) Patent No.: US 8,551,212 B1
(45) Date of Patent: Oct. 8, 2013

(54) SYSTEM AND PROCESS FOR RECOVERING BASE AND PRECIOUS METALS

(76) Inventor: Behrouz Kawarizadeh, New Albany, OH (US)

( * ) Notice: Subject to any disclaimer, the term of this patent is extended or adjusted under 35 U.S.C. 154(b) by 292 days.

(21) Appl. No.: 13/017,830

(22) Filed: Jan. 31, 2011

Related U.S. Application Data

(60) Provisional application No. 61/299,992, filed on Jan. 31, 2010.

(51) Int. Cl.
*C22B 7/00* (2006.01)
*C22B 11/00* (2006.01)

(52) U.S. Cl.
USPC ............... 75/401; 75/403; 210/353; 210/749

(58) Field of Classification Search
USPC ............... 75/401, 403; 210/749, 353
See application file for complete search history.

(56) References Cited

U.S. PATENT DOCUMENTS

| | | | | |
|---|---|---|---|---|
| 4,426,225 A * | 1/1984 | Ida et al. | | 75/715 |
| 4,426,251 A * | 1/1984 | Ida et al. | | 216/92 |
| 6,986,192 B2 * | 1/2006 | Fitch | | 29/403.1 |
| 7,166,145 B1 * | 1/2007 | Han | | 75/744 |
| 8,057,572 B2 * | 11/2011 | Mauldin | | 75/353 |

* cited by examiner

*Primary Examiner* — George Wyszomierski
*Assistant Examiner* — Tima M McGuthry Banks
(74) *Attorney, Agent, or Firm* — James R. Eley; Michael A. Forhan; Eley Law Firm Co. LPA

(57) ABSTRACT

A system for recovering precious metals. A container is configured to receive recyclable materials. The recyclable materials include non-metallic materials, base metals and precious metals. A separating solution is disposed in the container and is configured to separate the base metals and the precious metals from the non-metallic materials. The non-metallic materials, base metals, and precious metals are subsequently separated from each other.

10 Claims, 4 Drawing Sheets

SYSTEM AND PROCESS FOR RECOVERING BASE AND PRECIOUS METALS

This application claims priority to U.S. provisional patent application No. 61/299,992, filed Jan. 31, 2010, the entire contents of which are hereby incorporated by reference.

FIELD

The present invention relates generally to a system and method for recovering precious metals, in particular to a system and method for recovering precious metals from scrap electronic equipment.

BACKGROUND

Recycling of used materials is becoming an essential part of modern society. Recycling involves the processing of used materials into new products to reduce waste of potentially useful materials, decrease consumption of fresh raw materials, lower energy usage, reduce air pollution from incineration, and decrease water pollution. Recycling also decreases the need for landfills by reducing the need for waste disposal.

Used consumer electronic devices such as computers, printers, video monitors, radios and televisions, as well as used industrial equipment, is an increasing environmental concern. Due to ongoing technological advancement many electronic devices become obsolete within a short period of time, creating a large surplus of unwanted electronic devices that must be disposed of. In addition to the environmental concerns, there is a significant waste of useful materials in these electronic devices. In particular, many electronic devices contain components such as printed wiring assemblies, connectors and integrated circuits having gold plating. It is desirable to efficiently recover the gold plating from these components.

SUMMARY

A system and method for recovering gold from scrap electronic components is disclosed according to an embodiment of the present invention. Non-metallic materials having base metals and precious metals disposed thereon (or contained therein) are separated from the scrap. The select materials are then exposed to a separating solution, causing the base and precious metals to be separated from non-metallic materials to which they are attached. The base and precious metals are then filtered from the solution and removed.

One object of the present invention is a system for recovering base and precious metals. A container is configured to receive recyclable materials. The recyclable materials include non-metallic materials, base metals and precious metals. A separating solution is disposed in the container and is configured to separate the base metals and precious metals from the non-metallic materials metals. The non-metallic materials, base metals, and precious metals are separately removable from the separating solution.

Another object of the present invention is a method for recovering base metals and precious metals. Recyclable materials are obtained, the recyclable materials including non-metallic materials, base metals and precious metals. The recyclable materials are submerged into a separating solution for a period of time, sufficient for the base metals and precious metals to be separated from the non-metallic materials. The non-metallic materials, base metals, and precious metals are each separately removable from the separating solution.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
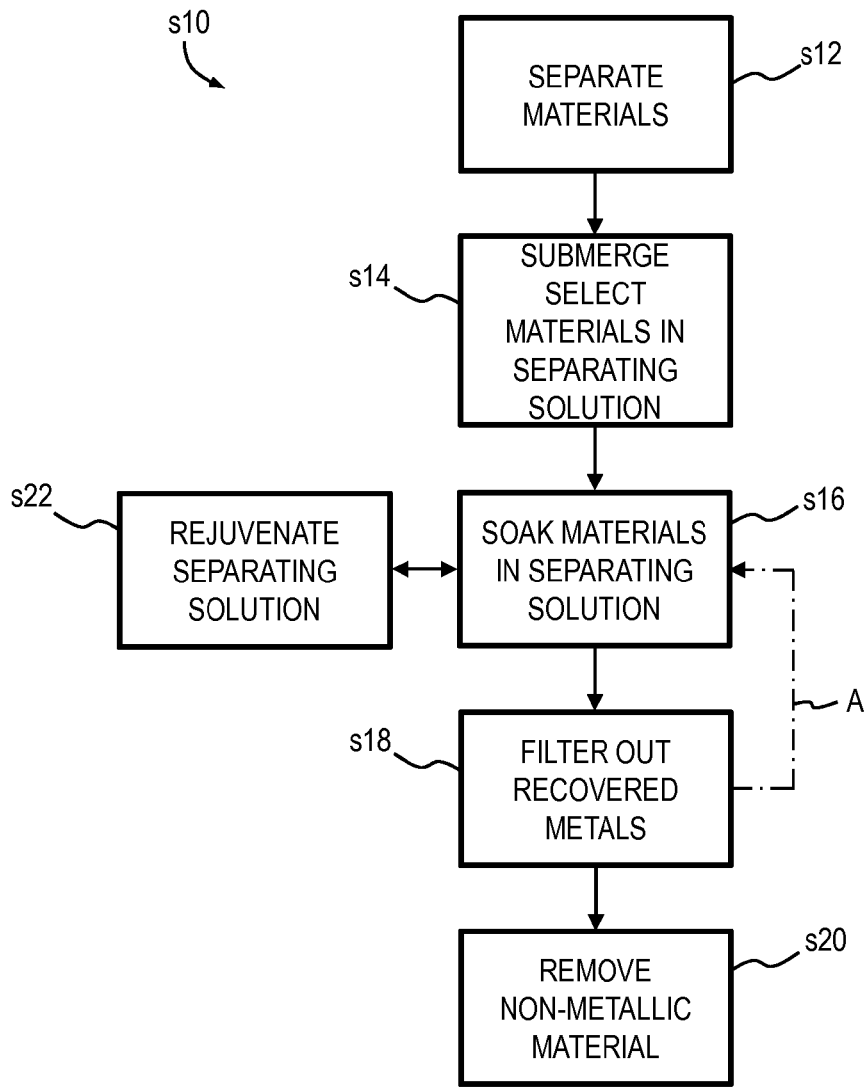
FIG. 1 is a flow diagram of a process for recovering base metals and precious metals according to an embodiment of the present invention.

In the discussion that follows, like reference numerals are used describe like elements and structures in the various figures.

A flow diagram showing the general arrangement of a process s10 for recovering base metals and precious metals is shown in FIG. 1 according to an embodiment of the present invention, although it will be understood that the order of the steps may be varied to suit a particular application of the method within the scope of the invention.

At s12 recyclable materials are separated in preparation for subsequent processing. It is preferable to separate carrier materials containing precious metals from other materials to the greatest extent possible, but without undue effort. As a non-limiting example of recyclable materials, gold-plated electrical connectors may be removed, broken away or cut away from their mounts or stripped from a non-metallic material (including, but not limited to, plastic and fiberglass) such as a printed wiring board. Likewise, gold-plated portions of printed wiring boards may be cut into small pieces or cut away from portions of the printed wiring boards not containing gold plating. In some instances it may be preferable to grind or crush the carrier materials into small pieces or a powder.

At s14 the recyclable materials (including non-metallic materials, base metals and precious metals disposed upon or contained by the non-metallic materials) are submerged into a separating solution that is configured to separate the metals from the non-metallic materials to which they were originally applied. In one embodiment the separating solution is comprised of a mixture of muriatic acid and hydrogen peroxide. This mixture will dissolve most of the metals, which is a solution of mostly cupric chloride. The mixture may be used by rejuvenation for dissolving more printed circuit boards. In another embodiment the separating solution may be made from a mixture of vinegar and hydrogen peroxide.

At s16 the carrier materials are left in the separating solution for a determinable period of time, to allow the gold plating to separate from the carrier materials. The amount of time will vary, based upon a number of factors including, but not limited to, the condition of the separating solution, the temperature of the separating solution, the size of the carrier materials and the amount of gold plating.

At s18 the separated gold plating is filtered from the separating solution. In one embodiment the separated gold plating (which may be in the form of small solids or "flakes") is removed from the separating solution by passing the separating solution through a filter material such as a mesh screen. The removal may be accomplished periodically, after which the carrier materials are returned to the soak of s16. The process of s16 and s18 is then repeated, as indicated by arrow "A," until substantially all of the gold plating has been separated from the carrier material. Alternatively, steps s16 and s18 may be accomplished by continually circulating the separating solution through a filter to capture separated gold plating. The process of s16 and s18 may likewise be accomplished to separate (i.e., dissolve) base metals from the non-metallic material.

At s20 the non-metallic material left after removal of the gold plating is removed from the separating solution for further processing, which may include recycling and/or disposal.

At s22 the separating solution is rejuvenated to compensate for degradation caused by exposure to the carrier materials. Rejuvenation of cupric chloride, which may be manual and/or automatic, is accomplished by adding predetermined amounts of "fresh" (i.e., relatively pure or contaminated) muriatic acid and hydrogen peroxide to the separating solution or replacing the separating solution entirely. If a separating solution of vinegar and peroxide is used, additional quantities of fresh vinegar and peroxide may be added to the separating solution or the separating solution may be replaced entirely. Rejuvenation may be manually controlled by visually monitoring the color of the separating solution and adding the aforementioned materials when the color shifts from a predetermined color, indicating degradation of the separating solution.

Figure 2:
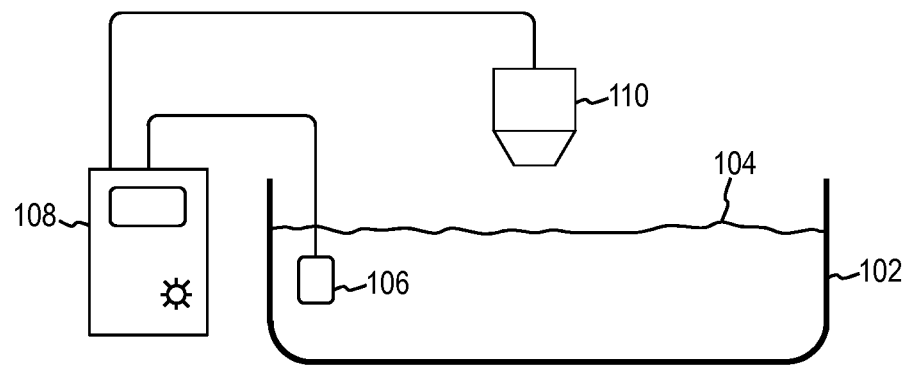
FIG. 2 is a schematic diagram of a system for recovering base metals and precious metals according to an embodiment of the present invention.

An alternate embodiment of the present invention is shown in FIG. 2. A container 102 holds a quantity of a separating solution 104. A transducer 106 is coupled to a monitor 108. Transducer 106 generates an electrical signal corresponding to the color and/or the chemical composition of separating solution 104 and activates a visual or aural alarm when the condition of the separating solution exceeds a predetermined threshold value. Monitor 108 may optionally be coupled to a dispenser 110 to automatically add the rejuvenation materials of s22 (FIG. 1) as needed to maintain the separating solution in a predetermined condition.

The system of FIG. 2 may also be used as a process monitor. In this instance the chemical composition and/or color of the separating solution is periodically or continuously measured by monitor 108, utilizing the electrical signal generated by transducer 106. When the process of s16 is active the chemical composition and/or color of the separating solution is changing due to the reaction between the separating solution and the material being soaked. However, the chemical composition and/or color of the separating solution will become relatively stable at the completion of the soak process. Monitor 108 detects the relatively stable state of the separating solution and activates a visual or aural alarm, indicating the completion of s16.

Figure 3:
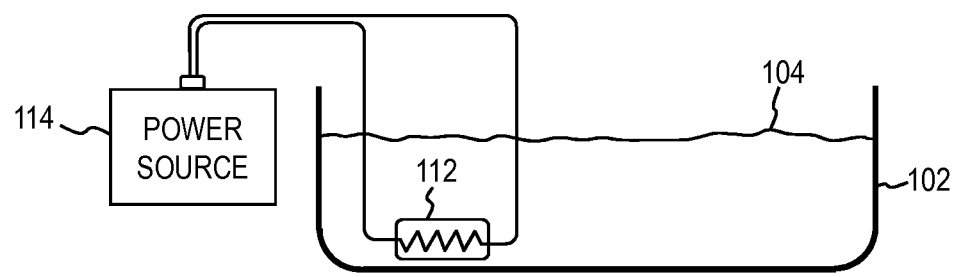
FIG. 3 is a schematic diagram showing a heater used in conjunction with a system for recovering base metals and precious metals according to an embodiment of the present invention.

Another alternate embodiment of the present invention is shown in FIG. 3. A container 102 holds a quantity of a separating solution 104. A heating element 112 is directly in thermal communication with separating solution 104, being submerged in the separating solution 104 and connected to an electrical power source 114. The heating element raises the temperature of the separating solution, thereby accelerating separation of the gold plating from the carrier material and thus reducing the amount of time required for s16. Alternatively, heating element 112 may be placed in indirect thermal communication with separating solution 104, such as by placing the heating element into contact with container 102 and heating the container, which in turn will heat the separating solution.

Figure 4:
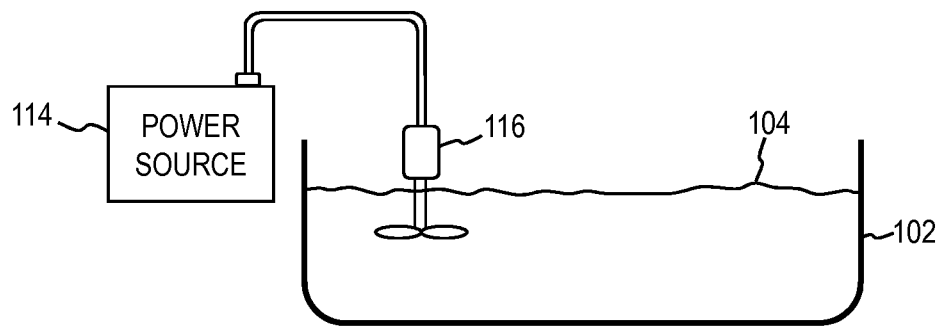
FIG. 4 is a schematic diagram showing an agitator used in conjunction with a system for recovering base metals and precious metals according to an embodiment of the present invention.

Yet another embodiment of the present invention is shown in FIG. 4. A container 102 holds a quantity of a separating solution 104. A fluid agitator 116, which may include or be a fluid pumping device, is submerged in separating solution 104 and connected to an electrical power source 114, causing the separating solution to circulate and thus accelerating separation of the gold plating from the carrier material, thereby reducing the amount of time required for s16.

Figure 5:
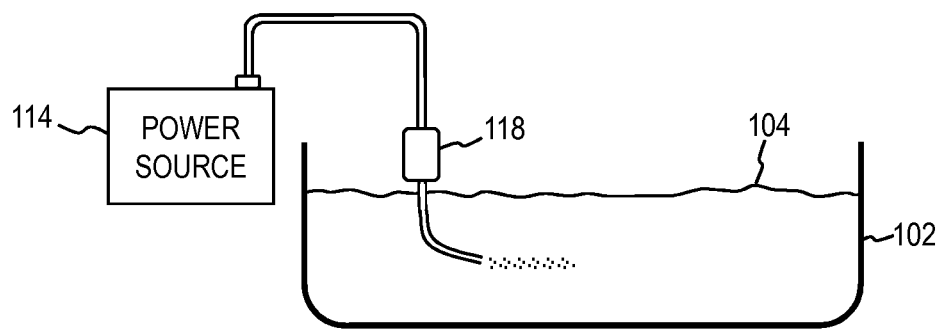
FIG. 5 is a schematic diagram showing an air pump used in conjunction with a system for recovering base metals and precious metals according to an embodiment of the present invention.

Still another embodiment of the present invention is shown in FIG. 5. A container 102 holds a quantity of a separating solution 104. An output of an air pump 118 or other aeration device is submerged in separating solution 104 and connected to an electrical power source 114, causing oxygen to be added to the separating solution and thus accelerating separation of the gold plating from the carrier material, thereby reducing the amount of time required for s16.

In some embodiments the process of FIG. 1 may be used to remove electronic components such as surface-mount devices from printed wiring boards at s16. Once removed at s18, the electronic components may be crushed at s12, then subjected to the process of s14 through s22 to recover gold plating from the interior of the electronic components. Likewise, printed wiring boards may be crushed to gain access to internal metal layers.

It should be noted that a certain amount of gold plating may be dissolved in the separating solution and thus less susceptible to filter step s18. However, the dissolved gold plating may be recovered using any conventional precipitation reaction, mixing the separating solution with a predetermined second solution to separate a predetermined solid from the mixture. Alternately, any electrochemical process now known or later developed to separate predetermined dissolved solids from the separating solution may be used.

The present invention may be employed to recover metals other than gold particulate. In one embodiment electrolysis, using a select voltage, may be utilized to precipitate desired elements, such as base and precious metals, at s18. Similar processes, such as electrowinning and electrorefining, may also be employed.

Figure 6:
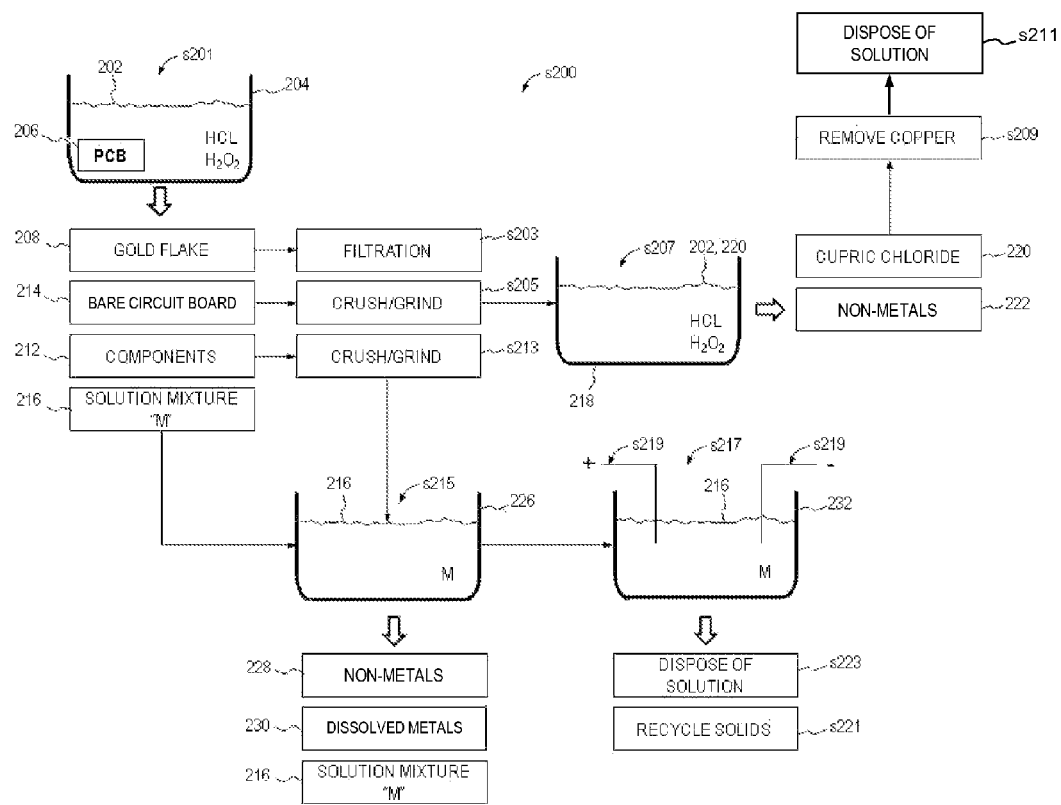
FIG. 6 is a diagram showing a recycling system according to an embodiment of the present invention.

A process 200 for recycling used materials, such as printed circuit board assemblies, is shown in FIG. 6. At step s201 a starting separating solution 202 comprising hydrogen chloride (HCL) and hydrogen peroxide ($H_2O_2$) is placed in a tank 204 and a printed circuit board assembly (PCB) 206 is immersed in the starting separating solution.

After PCB 206 has been immersed in tank 204 for a determinable period of time gold flake 208 will be separated from the PCB. The gold flake 208, which may be filtered at step s203 in any conventional manner, including the filtration processes discussed above. In addition, electronic components 212, such as, for example, integrated circuits, will separate from PCB 206, leaving a bare circuit board 214. Furthermore, starting separating solution 202 will be transformed to a separating solution mixture "M" 216 comprising dissolved base metals from PCB 206, in particular components 212 and bare circuit board 214. In the event that separating solution 202 becomes inactive during step s201 the separating solution may be "rejuvenated" to increase its efficacy by adding a predetermined amount of HCL and $H_2O_2$ to tank 204.

Non-metallic material comprising bare circuit board 214 is broken apart by crushing and grinding into powder at step s205, then at step s207 the powder is immersed in a tank 218 containing a starting separating solution 202. After the powder of bare circuit board 214 have been immersed in tank 218 for a determinable period of time the metals will be dissolved into a primarily cupric chloride solution 220 comprising HCL, $H_2O_2$ and copper from the traces and lands of the bare circuit board. At the completion of step s207 tank 218 will contain non-metallic pieces 222 that may be separated and recycled. The process of steps s205, s207 may be repeated using the solution 220 in tank 218 until the solution becomes saturated. Once solution 220 becomes saturated the dissolved metals (mostly copper) in the solution may be removed at step s209 by any conventional process, such as precipitation. The solution, with much of the metals removed, may be neutralized and disposed of at step s211. The process of step s207 may be rejuvenated to increase its efficacy by adding HCL and $H_2O_2$ to tank 218.

Components 212 may also be ground, as at step s213, then immersed for a determinable period of time at step s215 in a solution M 216 (from step s201) contained by a tank 226. At the completion of step s215 tank 226 will contain non-metallic pieces 228 and dissolved metals 230 that may be separated and recycled, as well as solution M 216.

The solution M 216 in tank 226 may be rejuvenated to increase its efficacy by adding HCL and $H_2O_2$ to the tank. When solution M 216 reaches a saturation point the solution M is transferred to a tank 232. At step s217 dissolved metals in the saturated solution M 216 are separated by any conventional sub-process, such as electrolysis, at step s219, resulting in solids that are recycled at step s221. In one embodiment step s221 includes sending the solids to a refinery for further processing. Finally, the remaining solution M216 is neutralized and disposed of at step s223.

It should be noted that the primary chemicals used in the disclosed invention are environmentally friendly. HCL is commonly found as a pool cleaning solution, while $H_2O_2$ is a common chemical used in human hair styling. Oxygen may also be used in addition to or in place of $H_2O_2$ as an oxidizing agent. Furthermore, vinegar may be used as a starting solution 202, either by itself or in combination with oxygen and/or $H_2O_2$.

From the above description of the invention, those skilled in the art will perceive improvements, changes, and modifications in the invention. Such improvements, changes, and modifications within the skill of the art are intended to be covered. For example, the embodiments of some or all of FIGS. 2 through 5 may be combined with the process of FIG. 1 within the scope of the invention.

What is claimed is:

1. A method for recovering precious metals, comprising the steps of:
    obtaining recyclable materials, the recyclable materials including non-metallic materials, base metals, and precious metals;
    submerging the recyclable materials into a separating solution for a period of time, sufficient for the base metals and the precious metals to be separated from the non-metallic materials,
    the non-metallic materials, base metals, and precious metals each being separately removable from the separating solution; and
    continuously filtering the separated precious metals from the separating solution.

2. The method of claim 1, further including the step of separating the recyclable materials from non-recyclable materials.

3. The method of claim 1, further including the step of removing the non-metallic materials from the separating solution after the base metals and the precious metals have been separated therefrom.

4. The method of claim 1 wherein the separated precious metals are filtered from the separating solution with a mesh screen.

5. The method of claim 1 wherein the separating solution comprises hydrogen peroxide.

6. The method of claim 1 wherein the separating solution comprises a mixture of muriatic acid and hydrogen peroxide.

7. The method of claim 1 wherein the separating solution comprises a mixture of vinegar and hydrogen peroxide.

8. The method of claim 1, further including the step of adding a determinable amount of fresh separating solution to rejuvenate the separating solution.

9. The method of claim 1 further including the step of separating the base metals and precious metals using at least one of a precipitation reaction, an electrochemical process, and electrolysis.

10. A method for recovering precious metals, comprising the steps of:
    obtaining recyclable materials, the recyclable materials including non-metallic materials, base metals, precious metals, and electronic components attached to the non-metallic materials;
    submerging the recyclable materials into a separating solution for a period of time, sufficient for the base metals and the precious metals to be separated from the non-metallic materials, the electronic components also being separated from the non-metallic materials;
    removing the non-metallic materials from the separating solution and, if the non-metallic materials contain at least one of base metals and precious metals, breaking apart the non-metallic materials to expose the base metals and precious metals and submerging them in the separating solution for a period of time, sufficient for the base metals and precious metals to be separated from the non-metallic materials by the separating solution; and
    removing the electronic components from the separating solution and, if the electronic components contain at least one of base metals and precious metals, breaking apart the electronic components to expose the base metals and precious metals and submerging them in the separating solution for a period of time, sufficient for the base metals and precious metals to be separated from the electronic components by the separating solution,
    the non-metallic materials, base metals, and precious metals each being separately removable from the separating solution.

* * * * *